United States Patent [19]

Clement-Demange

[11] Patent Number: 5,116,212
[45] Date of Patent: May 26, 1992

[54] SYSTEM FOR INJECTING MOLTEN MATERIAL INTO A MOLDING APPARATUS

[76] Inventor: Jean-Claude A. Clement-Demange, 27, rue du Four á Chaux, Jouy Le Moutier, Cergy, France

[21] Appl. No.: 578,325

[22] Filed: Sep. 6, 1990

[30] Foreign Application Priority Data

Sep. 8, 1989 [FR] France ............................ 89 11789

[51] Int. Cl.$^5$ .......................................... B29C 45/76
[52] U.S. Cl. .................................. 425/147; 425/544; 425/557; 425/585
[58] Field of Search ............... 425/145, 147, 171, 525, 425/557, 558, 559, 560, 544

[56] References Cited

U.S. PATENT DOCUMENTS

| 3,417,433 | 12/1968 | Teraoka ............................ 425/559 |
| 4,557,683 | 12/1985 | Meeker et al. ..................... 425/147 |

FOREIGN PATENT DOCUMENTS

| 514078 | 1/1981 | Australia. |
| 1000210 | 2/1952 | France. |
| 2225113 | 1/1977 | France. |
| 2419815 | 10/1979 | France. |

Primary Examiner—Tim Heitbrink
Attorney, Agent, or Firm—Ostrolenk, Faber, Gerb & Soffen

[57] ABSTRACT

A system for injecting molten material into a receiving apparatus, such as a moulding apparatus. The system according to the invention utilizes at least a melting chamber and an injecting chamber which are incorporated in a same housing and which are connected through a canal for transferring molten material contained in the melting chamber to the injecting chamber. The system further utilizes an apparatus for controlling the feeding of the injecting chamber and the triggering of the injecting apparatus when the injecting chamber has a predetermined quantity of molten material to be injected.

10 Claims, 2 Drawing Sheets

SYSTEM FOR INJECTING MOLTEN MATERIAL INTO A MOLDING APPARATUS

The present invention relates to a system for injecting molten material into a receiving apparatus, such as a moulding apparatus.

Systems for injecting molten material are known as comprising a melting kettle for melting meltable material connected to one or several apparatuses for injecting molten material, such as for example at least one gun, through one or several communicating pipes. However, such systems have a plurality of drawbacks. Among them are the bulkiness and the oxidation hazards of the molten material in the melting kettle and the impossibility of manually taking the injecting guns due to the very high temperature thereof.

The present invention is a system for injecting molten material, for example into a moulding apparatus, which obviates to the above drawbacks.

According to the invention, the system for injecting molten material into a moulding apparatus comprises an apparatus for melting meltable material and an apparatus for injecting molten material, the melting apparatus and the injecting apparatus both having a space or room collecting the molten material and an injecting chamber respectively; these two apparatuses being mounted in a same housing and the space having at least a melting chamber, each being in fluid communication through a transfer canal of the molten material contained in the injecting chamber; the system further comprising an apparatus for controlling the filling of the injecting chamber and the triggering of the injecting apparatus when the injecting chamber contains a predetermined quantity of molten material to be injected.

According to a feature of the invention, the injecting apparatus comprises a fixed body, preferably with a cylindrical internal surface, and a hollow cylinder forming a slide valve, the internal space of which forms the injecting chamber, the fixed body and the slide valve cylinder having in the lateral walls thereof passages forming part of the transfer canal, the slide valve cylinder being mounted in an axially movable manner in said fixed body between an inactive rest position where the two passages face each other for opening the transfer canal and an obstructing or closing position of the passage in the fixed body through the lateral wall of the slide valve cylinder, the system further comprising means for forcing back the molten material into the injecting chamber of the moulding apparatus.

According to another feature of the present invention, the forcing back means include an injecting nozzle in the form of a tube fixed to the slide valve cylinder and extending axially therein, an end of the tube opening or discharging outside the injecting apparatus, whereas its other end extends in the injecting chamber till a predetermined level above the injecting chamber bottom; the space in the chamber above the level of the molten material being capable of being in communication with a source of a fluid under pressure for forcing back or expulsing the molten material from the chamber to the tube in the moulding apparatus.

The invention has also for object a system for injecting molten material into a receiving apparatus, such as a molding apparatus, comprising an apparatus for melting meltable material including a melting chamber and an apparatus for injecting molten material having a hollow cylinder body delimiting an injecting chamber having an output opening intended to force back molten material from injecting chamber to the molding apparatus, the cylindrical body being axially movable in fixed clothing body, and means for forcing back molten material into the molding apparatus, said melting and injecting chambers being disposed in parallel and communicating therebetween through a transfer canal including portions passing through lateral walls of the movable body and clothing body, said communication being made or interrupted as soon as canal portion of the movable body faces or not canal portion of clothing body, respectively, wherein said melting and injecting chambers are juxtaposed and communicate therebetween at their bottom through the transfer canal, the latter opening in the vicinity of the bottom of said injecting chamber at a small distance above the bottom of the injecting chamber so that at a small displacement of the movable body upwardly, the latter is in obstructing position of the transfer canal and wherein the means for forcing back molten material into the molding apparatus includes means for feeding a fluid under pressure into the injecting chamber for forcing back molten material out of the injecting chamber through its output opening in order to inject upwardly molten material into the moulding apparatus.

BRIEF DESCRIPTION OF THE DRAWINGS

For a fuller understanding of the invention, reference is made to the following description taken in conjunction with the accompanying drawings, in which.

DETAILED DESCRIPTION OF THE PREFERRED EMBODIMENT

Figure 1:
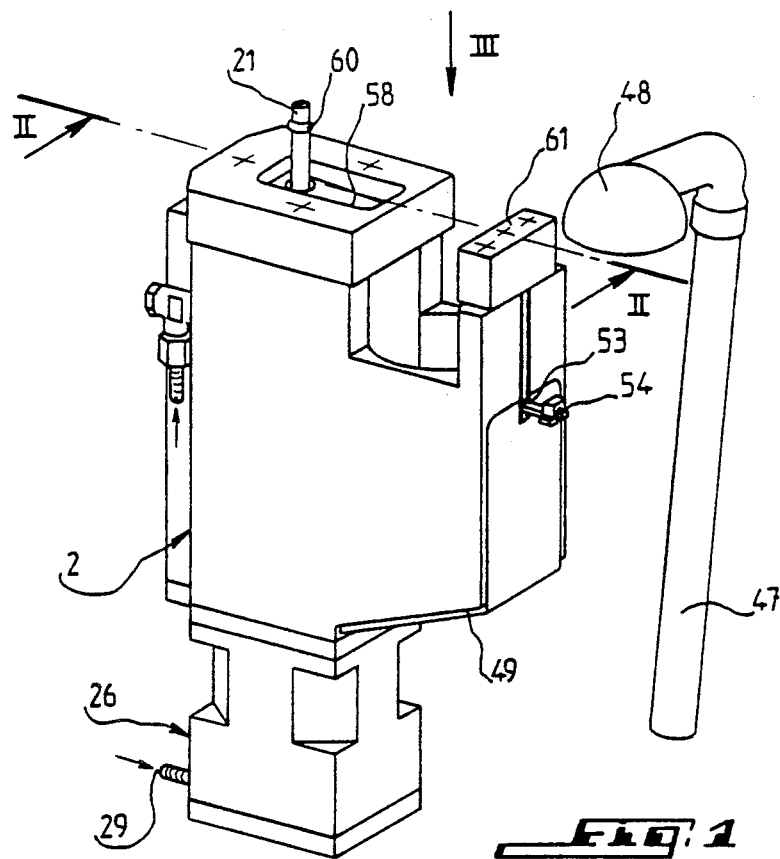
FIG. 1 is a perspective view of the system according to the invention with the housing removed.

The system for injecting molten material according to the invention comprises a housing or casing 1 in which is disposed a fixed body 2. A melting apparatus 3 of the meltable material and an injecting apparauts 4 of the molten material in a moulding apparatus are mounted in the fixed body 2, these two apparatuses including a melting chamber 5 and an injecting chamber 6, respectively, in communication with a transfer canal 7 for transferring the molten material contained in the melting chamber 5 into the injecting chamber 6. The fixed body 2 is disposed in the housing 1 and is maintained at a predetermined distance from the internal surface of housing 1 by spacing elements 8 by letting a heat insulating space 9 between the facing surfaces of the body 2 and the housing 1.

In order to form the injecting apparatus 4 of the present invention, the body 2 includes a cylindrical recess 12 in which is mounted in an axially movable manner a tubular cylinder forming a slide valve 13 closed at its top end 14 oriented to the moulding apparatus and opened at its lower end in which engages a piston element 15 fixed to the slide valve 13 by screwing as shown at reference number 16. The piston 15 defines within the slide valve cylinder 13 a space or room which constitutes the injecting chamber 6.

The injecting apparatus includes a nozzle in the form of a tube 18 which extends axially through the solid and upper part 14 of the slide valve cylinder 13, the tube 18 being fixed to this part. The tube 18 extends with an end within the injecting chamber 6 till a predetermined distance to the top surface of the piston 15 forming the bottom 19 of the injecting chamber 6. The other end 21 of the tube 18 issues at the top of the body 2, by passing through a plug element 22 closing the upper part of the space 12 of the body 2, for being introduced into the molding apparatus. Cylindrical lateral walls 23 of the chamber 6 have passages 24 at the bottom 19 thereof, for example three.

In order to impart to the piston 15 and the slide valve cylinder 13 a reciprocating movement in the body 2, the piston 15 is incorporated in a jack assembly including a fixed cylindrical element 26 axially aligned with the recess 12 and in which the piston is axially movable against a biasing spring 27 in the direction of the recess 12 under the effect of a fluid under pressure introduced at 29 into a space or room 30 forming the working chamber of the jack assembly.

The element 26 is attached to the lower end of the body 2 with the interposition of a sealing joint 31 and extends through a tubular part 32 axially inside the body 2 for providing the cylindrical internal surface of the injecting apparatus at the level of the injecting chamber 6. Indeed, the recess 12 of the body 2 is shaped in a receiving area of the tubular part 32 so that the cylindrical internal surfaces of the part 32 and of the recess 12 above the latter are axially aligned, and that an annular chamber 34 is formed around the part 32 which is closed at its lower end with a front surface 35 of element 26.

Figure 2:
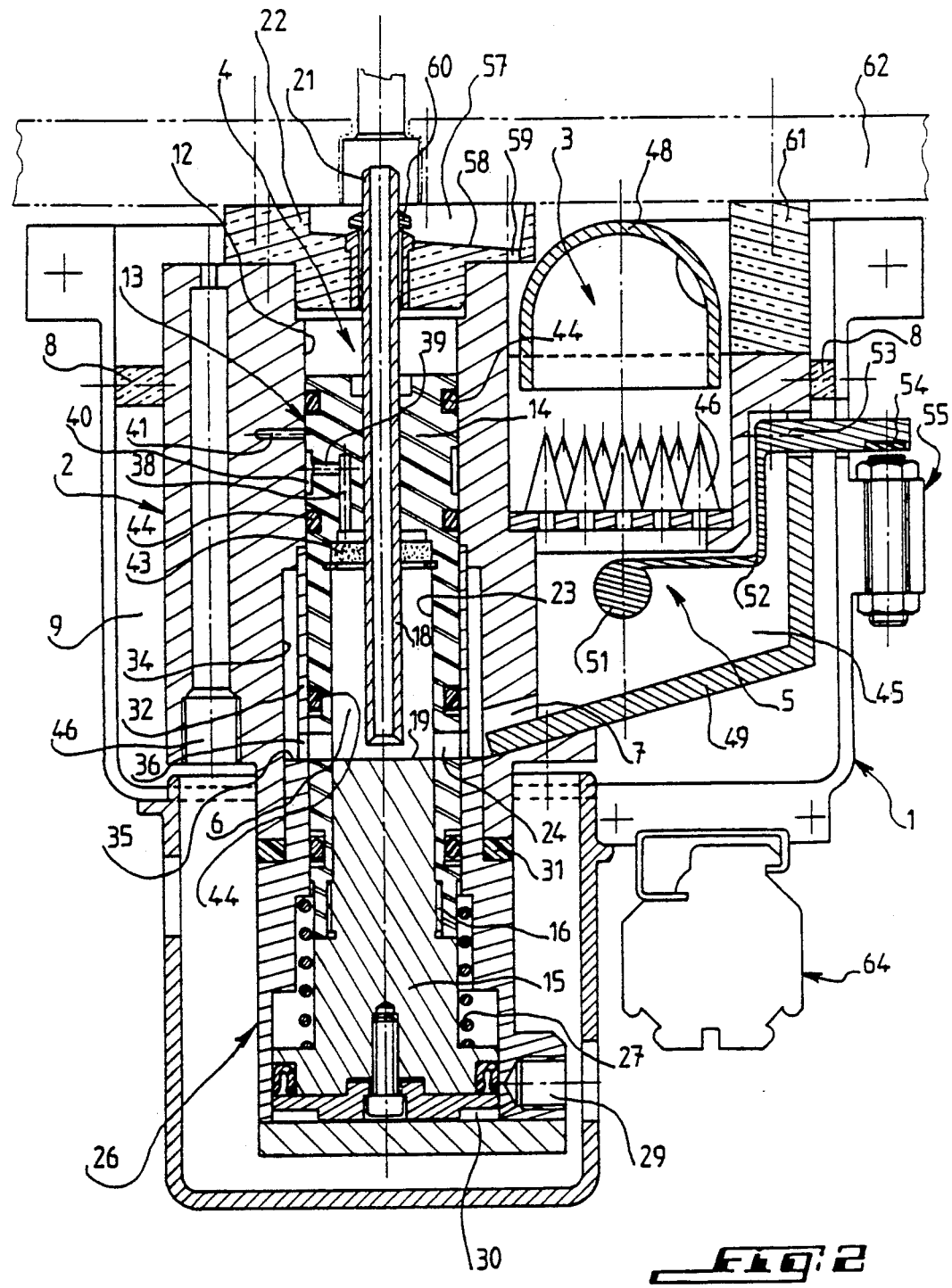
FIG. 2 is a longitudinal cross-sectional view, according to line II—II of FIG. 1, of the system for injecting molten material according to the present invention.

The front surface 35 of element 26 is located at the level of the bottom 19 of the chamber 6 when the piston 15 is at its inactive position, shown in FIG. 2. The tubular part 32 includes in the cylindrical wall thereof passages 36 which face passages 24 in the wall of slide valve cylinder 13 at the shown position of the injecting apparatus. These passages 36 open into the annular space 34 which communicates through the transfer canal 7 with the melting chamber 5. The piston 15 is axially movable from the inactive position shown in FIG. 1 over a distance such that the passages 36 are obstructed or closed by an external lateral surface of the slide valve cylinder 13.

Figure 3:
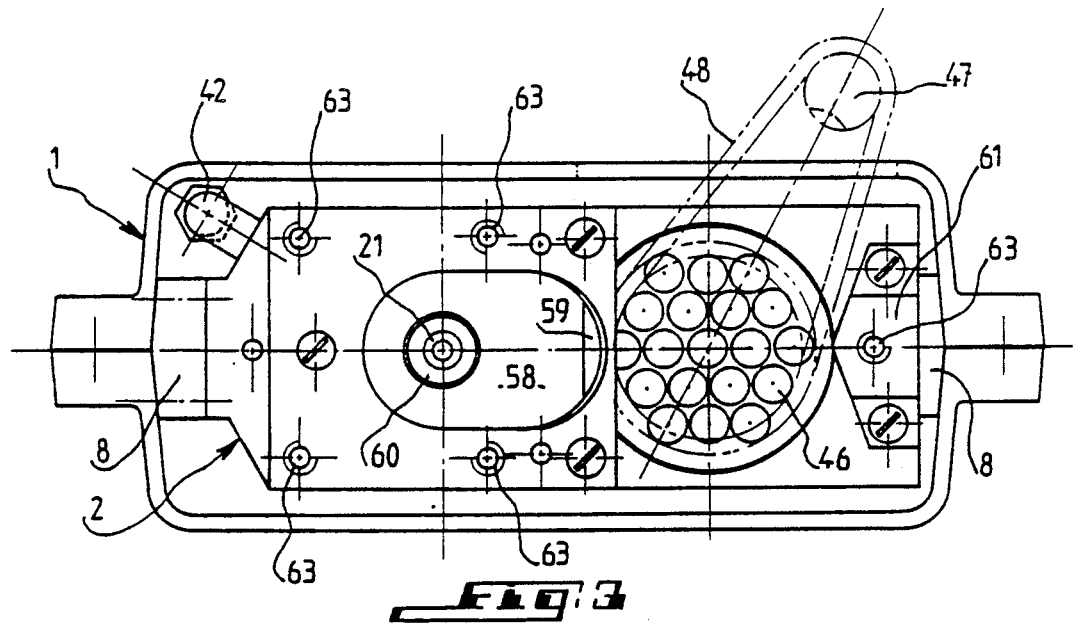
FIG. 3 is a top view of the system according to the invention in the direction of arrow III of FIG. 1.

The injecting apparatus includes means for forcing back the molten material in the chamber 6 in the moulding apparatus through the nozzle tube 18 under the effect of a fluid under pressure introduced in the chamber 6 through a pipe which opens or discharge into the surface of the chamber 6 and which has an axial part 38 communicating with a radial pipe 39 opening into an annular groove 40 of the external cylindrical surface of the upper part 14 of the slide valve cylinder 13. The annular groove 40 is capable of communicating with a radial canal 41 opening into the recess 12 of the body 2 above the groove 40 and communicating through an internal canal portion (not represented) with a pipe 42 connected to a source of a fluid under pressure (FIG. 3). The opening of canal 41 and the upper edge of the annular groove 40 are separated in axial direction of the slide valve cylinder 13 when the latter is at its inactive position and are in fluid communication as soon as the passages 36 and thus the transfer canal 7 are closed by the slide valve cylinder 13.

The expulsion apparatus further includes a diffuser 43 which is interposed in the upper part of the injecting chamber 6 between the admissible upper level of the molten material and the entry of the pipe 38 into the injecting chamber 6.

There is also provided on part 14 of the slide valve cylinder 13 two sealing rings 44 located on both sides of the annular groove 40 as well as a third sealing ring 44 in the wall of the chamber above the passage 24. An axial hole 46 is also provided in the body 2 and is intended to receive a heating element, such as for example a cartridge with shielded resistances.

The melting apparatus 3 includes in the melting chamber 5 above a tank part 45 of the molten material a heating assembly 46 in the form of a heat exchanger with pinholes intended to melt the granulated meltable material fed by an arrangement including a flexible tube 47 located outside the housing 1 and a pipe element 48 disposed above the heating assembly 46. The bottom of the chamber 5 and thus the bottom of the tank 45 are formed with a tight plate 49, the bottom of which is inclined downwardly towards the injecting apparatus 4. The plate 49 extends within the wall of the body 2 which delimits the cylindrical recess 12, which wall is drilled at the level of the end of the plate 49 with the above-mentioned transfer canal 7.

The operation of the system according to the invention is controlled by a control apparatus, which includes a float member 51 located in the tank 45 and which is fixed to an end of a lever 52 passing through the external wall of the melting apparatus at the level of the upper part of the plate 49, which lever is pivotally mounted at 53 to this external wall and has its other end which extends outwardly through the housing 1 and carries an element 54 making part of a position detecting device 55 of the proximity detector kind. This device is adapted to deliver a control signal when the float member 51 is at lower and upper determined positions. In the first case, the device controls the feeding of the melting apparatus 3 with meltable material in the form of granulates, and in the second case, it controls the transmission of the fluid under pressure through the pipe 29 into the chamber 30 of the piston 15 of the slide valve cylinder 13.

It is further to be noted that the plug 22, advantageously made of ceramic, of the recess 12 of the injecting apparatus 4 has in the output part of the nozzle tube 18 a recess 57, the bottom 58 of which is inclined downwardly towards the melting chamber 5 with which it communicates through an aperture 59. The end 21 of the nozzle tube 18 has a skirt or flange 60 for deviating the molten material flowing from the end 21 to the recess 57.

For completing the description, it is to be noted that the body 2 may be fixed through a column element 61 made of ceramic to a supporting means, such as a table schematically shown at 62, through screws screwed in threaded holes which are represented at 63. The housing 1 is further equipped with an apparatus 64 for mounting it onto a working table (not represented).

It is important that the whole injecting system of the present invention is disposed, when in operation, at a vertical position.

The operation of the injecting system according to the present invention as described here-above will be now detailed.

A predetermined quantity of granulated meltable material is fed to the melting apparatus 3 through flexible tube 47 and the pipe element 48. The meltable material is molten by the heating element 46 in the form of a heat exchanger with pinholes, and the molten material thus obtained moves down into the tank 45 through holes located between the pinholes of the heat exchanger. The transfer canal 7, which connects therebetween the melting chamber 5 and the injecting chamber 6, being open, the molten material flows from the tank 45 to the injecting chamber 6 until a balance of the predetermined level, which is controlled with the float member 51, is reached. At this instant, a pneumatic command is given and controls the transmission of fluid under pressure through the pipe 29, which permits to move the piston 15 upwardly and compress the biasing spring 27. During its vertical movement, the piston 15 transmits its displacement to the slide valve cylinder 13 which closes the feeding apertures 24 of the molten material, tightening the injecting chamber 6 and driving the nozzle tube 18 into contact with an injecting point located on the moulding apparatus with a strength greater than the sum of the strengths on the spring 27 and the counter-pressure capable of being applied to the material contained within the injecting chamber 6.

At this instant, a second pneumatic command is given to permit to the fluid under pressure to be fed, through the pipes 42 and 41, the annular groove 40 and the pipes 38 and 39, to the diffuser 43 formed with a porous material such as baked bronze or ceramic. The latter distributes the pressure of the molten material, without creating privileged or specific cooling areas, and under the pressure of the fluid, the molten material raises in the nozzle tube 18 to fill the moulding apparatus.

A command coming from the moulding apparatus stops the two above commands and puts the pipes 29 and 42 at the atmospheric pressure. Under the action of the spring 27, the piston 15 and the slive valve cylinder 13 come back to their initial position which opens the apertures 24 through which the material stocked in the tank 45 can again feed the injecting chamber 6 till the balance of the predetermined level.

The quantity of molten material in reserve in tank 45 is equal to one or twice the quantity of the material in the injecting chamber 6. When the consumption of molten material during one or several cycles lowered sufficiently the level of the material in the tank 45, the float member 51 triggers the position detector 55 which controls a granulate distributor apparatus (not shown) transmit through pneumatic way and through the flexible tube 47 of the pipe element 48 a predetermined granulated meltable material load. The meltable material needs a certain time for melting and setting back the float member 51 into high position. The cycles can then continue again.

The system for injecting material into a molding apparatus according to the present invention has a plurality of advantages. Indeed, the melting apparatus and the injecting apparatus assembled in the same housing offer a small bulkiness, which permits to dispose about fifteen similar systems on a working station. Each of these systems may operate at its own rate owing to the automatization of the feeding with granulates and of the proportioning of the quantity to be injected. Furthermore, owing to the automatization of the meltable material feeding and of the injection proportioning, it is possible to avoid the oxidation of the molten material. Finally, the system disposed in the housing is easily prehensile owing to the heat insulation with an air layer between the housing and the apparatuses accommodated therein, which permits on the one hand to lower the housing temperature and on the other hand to reduce the heat convection and radiation losses in the system. It is further to be noted that the vertical disposition of the system avoids the use of an obturating valve at the end of the flexible nozzle tube and that in the case where molten material flows during the injection, this material may come down into the molten material tank.

The system according to the invention may use polymer and more particularly meltable glues, which permit to glue a product. The system of the invention is used for making duplicate moulding on long and cumbersome articles, such as wire bundles, for filling connectors, etc.

It is obvious that many modifications may be made to the invention. For example, a plurality of melting chambers may be provided as being connected to a single injecting chamber, which would increase the filling rate of the injecting chamber and thus accelerate the moulding cycle speed.

What is claims is:
1. An apparatus for injecting material into a cavity comprising:
 a device for melting meltable material into a molten material and having a vertical melting chamber;
 a device for injecting said molten material having a valve cylinder which is slidable in a fixed body and delimiting therein a vertical injection chamber, said injection chamber having an outlet port through which said molten material is forced from said injection chamber to said cavity;
 means for vertically moving said slidable valve cylinder from a lower position to an upper position;
 means for controlling the level of said molten material in said melting chamber and thereby controlling an amount of said molten material in said injection chamber and triggering an injection operation when said injection chamber is filled with a predetermined amount of said molten material to be injected;
 means for forcing said molten material in said injection chamber into the cavity through said outlet port when said slidable valve member is in said upper position;
 wherein said melting chamber and said injection chamber are vertically juxtaposed and communicate therebetween at their respective bottoms, when said slidable valve cylinder is in said lower position, through a transfer canal constituted by a first canal portion traversing a lateral wall of said fixed body and a second canal portion traversing a lateral wall of said slidable valve cylinder, said second canal portion located in the vicinity of the bottom of said injection chamber at a small distance thereabove and facing said first canal portion so that said molten material can flow from said melting chamber to said injection chamber until a predetermined level of said molten material in said injection chamber, controlled by said controlling and triggering means, is reached;
 wherein said moving means moves said slidable valve cylinder upwardly to the upper position once said injection chamber is filled with said molten material so as to obstruct said second canal portion; and
 wherein said forcing means include a source of a fluid under pressure and means for feeding the fluid under pressure into said injection chamber when the slidable valve cylinder is in its upper position to force said molten material out of the injection chamber through said outlet port in order to inject said molten material upwardly into said cavity.

2. Apparatus according to claim 1, wherein said forcing means further include an injection nozzle in the form of a tube attached to the slidable valve cylinder and extending axially therein with one end of the tube forming said outlet port which opens outside said injection device and an opposite end of the tube extending is said injection chamber to a predetermined distance above the bottom thereof; and said fluid source being in fluid communication with a space defined in said injection chamber above the surface of the molten material therein through said feeding means so that the molten material is forced through said tube into said cavity.

3. Apparatus according to claim 2, wherein said moving means include a jack assembly, a cylinder of said jack assembly being fixed to said fixed body and a piston of said jack assembly being fixed to said slidable valve cylinder in a manner to delimit therewith said injection chamber, and to move said slidable valve cylinder towards said upper position against the action of a biasing spring by introducing a fluid under pressure into a working chamber of said jack assembly.

4. Apparatus according to claim 3, wherein said controlling and triggering means include a float member disposed in said melting chamber and fixed to an end of a lever pivotally mounted to a wall of said melting chamber, the other end of the lever carrying means making part of a position detector means to which is associated a device for generating control signals so that said detector means detects a lower level position of the float member and produce accordingly a signal controlling feeding of the melting chamber with said meltable material and an upper level position of the float member to produce accordingly a signal controlling the introduction of the fluid under pressure into said working chamber, thereby moving said slidable valve cylinder to said upper position.

5. Apparatus according to claim 4, wherein said controlling and triggering means further include control means permitting the fluid under pressure from said source to be fed into the space of the injection chamber when the slidable valve cylinder is in said upper position.

6. Apparatus according to claim 2, wherein said feeding means include an annular groove provided at an external cylindrical surface of said slidable valve cylinder, an internal canal provided in the slidable valve member connecting said annular groove to said space; and a radial canal provided in said fixed body connected to said source of fluid under pressure, said radial canal and said annular groove being in fluid communication when said slidable valve cylinder is in said upper position.

7. Apparatus according to claim 2, wherein said forcing back means further include a diffuser means formed with a porous material and disposed in said space between said feeding means and an admissible upper level of said molten material in said injection chamber for evenly distributing the pressure of said molten material.

8. Apparatus according to claim 1, wherein said melting chamber includes a tank for molten material communicating through said transfer canal with said injection chamber and a heating assembly in the form of a heat exchanger with pinholes located above said tank to melt said meltable material fed therein.

9. Apparatus according to claim 1, wherein said melting device and injection device are mounted in said fixed body, said fixed body being mounted and maintained in a housing at a predetermined distance from an internal surface thereof by spacing elements to define therebetween a heat insulating space.

10. Apparatus according to claim 2, wherein said nozzle tube has its upper end surrounded with a flange to deviate a flow of molten material into a recess communicating with said melting device.

* * * * *